United States Patent
Staranowicz et al.

(10) Patent No.: US 10,057,538 B2
(45) Date of Patent: Aug. 21, 2018

(54) APPARATUS AND METHODS FOR THE SELECTION OF ONE OR MORE FRAME INTERPOLATION TECHNIQUES

(71) Applicant: GoPro, Inc., Carlsbad, CA (US)

(72) Inventors: Aaron Staranowicz, Carlsbad, CA (US); Ryan Lustig, Encinitas, CA (US)

(73) Assignee: GOPRO, INC., San Mateo, CA (US)

( * ) Notice: Subject to any disclaimer, the term of this patent is extended or adjusted under 35 U.S.C. 154(b) by 0 days.

(21) Appl. No.: 15/407,089

(22) Filed: Jan. 16, 2017

(65) Prior Publication Data

US 2018/0205909 A1    Jul. 19, 2018

(51) Int. Cl.
H04N 7/01    (2006.01)
H04N 11/20    (2006.01)

(52) U.S. Cl.
CPC ............. *H04N 7/014* (2013.01); *H04N 11/20* (2013.01)

(58) Field of Classification Search
CPC .......... H04N 7/014; H04N 7/01; H04N 11/20; H04N 11/02; H04N 11/04
USPC .............................. 348/441, 452, 459
See application file for complete search history.

(56) References Cited

U.S. PATENT DOCUMENTS

| | | | | |
|---|---|---|---|---|
| 7,423,691 B2* | 9/2008 | Orlick | .................... | H04N 7/012 348/441 |
| 7,460,172 B2* | 12/2008 | Min | ....................... | H04N 5/145 348/441 |
| 7,868,946 B2* | 1/2011 | Ha | ....................... | H04N 19/513 348/416.1 |
| 8,488,059 B2* | 7/2013 | Burns | .................... | H04N 7/014 348/441 |
| 8,606,073 B2 | 12/2013 | Woodman | | |
| 9,001,895 B2* | 4/2015 | Ohta | ....................... | G09G 5/00 348/538 |
| 9,171,577 B1 | 10/2015 | Newman et al. | | |

(Continued)

OTHER PUBLICATIONS

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.

(Continued)

*Primary Examiner* — Trang U Tran
(74) *Attorney, Agent, or Firm* — Gazdzinski & Associates, PC (57) ABSTRACT

Methods and apparatus for the generation of interpolated frames of video data. In one embodiment, the interpolated frames of video data are generated by obtaining two or more frames of video data; performing Lagrangian interpolation on one or more portions of the obtained two or more frames of video data to generate a Lagrangian interpolated image; performing Eulerian interpolation on one or more portions of the obtained two or more frames to generate a Eulerian interpolated image; and when the Lagrangian interpolated image and the Eulerian interpolated image should be combined, computing an average interpolated image using the Lagrangian interpolated image and the Eulerian interpolated image; otherwise, selecting either the Lagrangian interpolated image or the Eulerian interpolated image; and generating an interpolated frame of video data using one or more of the average interpolated image, the Lagrangian interpolated image, or the Eulerian interpolated image.

20 Claims, 5 Drawing Sheets

(56) References Cited

U.S. PATENT DOCUMENTS

| | | |
|---|---|---|
| 2003/0007567 A1 | 1/2003 | Newman et al. |
| 2016/0239340 A1 | 8/2016 | Chauvet et al. |
| 2016/0274338 A1 | 9/2016 | Davies et al. |

OTHER PUBLICATIONS

Allène C., et al., "Seamless Image-based Texture Atlases Using Multi-band Blending," Pattern Recognition, 2008. ICPR 2008. 19th International Conference on, 2008.

Badrinarayanan V., et al., "Segnet: a Deep Convolutional Encoder-Decoder Architecture for Image Segmentation," arXiv preprint arXiv:1511.00561, 2015.

Baker, et al., "A Database and Evaluation Methodology for Optical Flow" International Journal of Computer Vision 92.1 (2011): 1-31.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Brox, et al., "High Accuracy Optical Flow Estimation Based on a Theory for Warping", European Conference on Computer Vision, Springer-Verlag Berlin Heidelberg, 2004.

Burt et al., "A Multiresolution Spline with Application to Image Mosaics," in ACM Transactions on Graphics (TOG), 1983, vol. 2, No. 4, pp. 217-236.

Chan T.F. and Vese La., "Active contours without edges". IEEE Transactions on Image Processing, 2001, 10 (2), pp. 266-277 (hereinafter "Chan").

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.

Davis, et al., "The Visual Microphone: Passive Recovery of Sound from Video" (2014).

Didyk, et al., "Joint View Expansion and Filtering for Automultiscopic 3D Displays", ACM Transactions on Graphics (TOG) 32.6 (2013): 221.

Elen R., "Whatever happened to Ambisonics" AudioMedia Magazine, Nov. 1991.

Gracias N., et al., "Fast Image Blending Using Watersheds and Graph Cuts," Image and Vision Computing, 2009, vol. 27 (5), pp. 597-607.

Herbst E., et al., "Occlusion Reasoning for Temporal Interpolation Using Optical Flow," Department of Computer Science and Engineering, University of Washington, Tech. Rep. UW-CSE-09-08-01, 2009.

Jakubowski M., et al., "Block-based motion estimation algorithms—a survey," Opto-Electronics Review 21, No. 1 (2013), pp. 86-102.

Kendall A., et al., "Bayesian Segnet: Model Uncertainty in Deep Convolutional Encoder-Decoder Architectures for Scene Understanding," arXiv:1511.02680, 2015.

Lowe D.G., "Object Recognition From Local Scale-invariant Features," Computer vision, The proceedings of the seventh IEEE international conference on 1999, vol. 2, pp. 1150-1157.

Mitzel D., et al., "Video Super Resolution Using Duality Based TV-l 1 Optical Flow," Joint Pattern Recognition Symposium, 2009, pp. 432-441.

Pérez et al., "Poisson Image Editing," in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Schwartz, E., et al., "Implementation of Compression with Reversible Embedded Wavelets," In Proc. SPIE, 1995, 12 pages.

Shannon, "A Mathematical Theory of Communication", Bell Syst. Tech. J., 27:379-423, 623-656, 1948.

Suzuki et al., "Inter Frame Coding with Template Matching Averaging," in IEEE International Conference on Image Processing Proceedings (2007), vol. (III), pp. 409-412.

Szeliski, et al., "Fast Poisson blending using Multi-Splines." Computational Photography (ICCP), 2011 IEEE International Conference.

Szeliski R., "Computer vision: algorithms and applications," Springer Science & Business Media, 2010.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Vass, J., et al., "Efficient Three-Dimensional Wavelet Codecs for Networked Video Communication," in Proceedings of IEEE International Conference on Image Processing, Kobe, Japan, Oct. 1999, pp. 565-569.

Wadhwa, et al., "Phase-Based Video Motion Processing", ACM Transactions on Graphics (TOG) 32.4 (2013): 80.

Weinzaepfel, et al., "Deepflow: Large displacement optical flow with deep matching", Proceedings of the IEEE International Conference on Computer Vision, 2013.

Xiao J., and Quan L., "Multiple View Semantic Segmentation for Street View Images," 2009 IEEE 12th International Conference on Computer Vision, 2009, pp. 686-693.

Xiong Y., et al., "Gradient Domain Image Blending and Implementation on Mobile Devices," International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

\* cited by examiner

APPARATUS AND METHODS FOR THE SELECTION OF ONE OR MORE FRAME INTERPOLATION TECHNIQUES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image post-processing and in one exemplary aspect, to methods and apparatus for generating interpolated frames of data via the intelligent selection of one or more frame interpolation techniques.

Description of Related Art

Frame interpolation is a common post-processing technology that enables, for example, modern display devices to increase the perceived framerate of natively captured video data. In general, frame interpolation algorithms include a two-step process that include a motion interpolation block and a frame blending block. For example, frame interpolation techniques enable the ability to take into account the motion of pixels on the frames of video data by analyzing the spatial relationship between pixels in the initial and subsequent frame. By taking into consideration this motion of pixels, an intermediate frame may be generated that utilizes information contained within the natively captured adjacent frames. Similarly, the frame blending block generates an intermediate frame of data by interpolating, for example, the color of pixels contained within these natively captured adjacent frames.

However, a high degree of accuracy for the produced intermediate frame requires a high degree of accuracy in the motion interpolation block. Accordingly, inaccurate pixel correspondences lead to inaccurate motion estimations resulting in low quality or distorted interpolated frames. Accordingly, techniques are needed to improve upon these frame interpolation techniques, and improve upon motion estimation calculations for the motion interpolation block in order to enable, for example, modern display devices to perform to their capabilities when displaying video content that was natively captured at, for example, lesser frame rates.

SUMMARY

The present disclosure satisfies the foregoing needs by providing, inter alia, methods and apparatus for the intelligent selection of one or more frame interpolation techniques in order to, for example, generate interpolated frame(s) of higher quality.

In a first aspect of the present disclosure, a computerized apparatus for the selection of one or more frame interpolation techniques is disclosed. In one embodiment, the computerized apparatus includes a processing apparatus; and a storage apparatus in data communication with the processing apparatus, the storage apparatus having a non-transitory computer readable medium comprising instructions which are configured to, when executed by the processing apparatus, cause the computerized apparatus to: obtain two or more frames of video data; perform Lagrangian interpolation on one or more portions of the obtained two or more frames of video data to generate a Lagrangian interpolated image; perform Eulerian interpolation on one or more portions of the obtained two or more frames to generate a Eulerian interpolated image; and when the Lagrangian interpolated image and the Eulerian interpolated image should be combined, compute an average interpolated image using the Lagrangian interpolated image and the Eulerian interpolated image; otherwise, select either the Lagrangian interpolated image or the Eulerian interpolated image; and generate an interpolated frame of video data using one or more of the average interpolated image, the Lagrangian interpolated image, or the Eulerian interpolated image.

In one variant, the non-transitory computer readable medium further comprises instructions which are configured to, when executed by the processing apparatus, cause the computerized apparatus to: generate the interpolated frame of video data using two or more of the average interpolated image, the Lagrangian interpolated image, or the Eulerian interpolated image.

In another variant, the non-transitory computer readable medium further comprises instructions which are configured to, when executed by the processing apparatus, cause the computerized apparatus to: generate the interpolated frame of video data using the average interpolated image, the Lagrangian interpolated image, and the Eulerian interpolated image.

In yet another variant, the one or more portions of the obtained two or more frames are selected on a per-pixel basis.

In yet another variant, the one or more portions of the obtained two or more frames are selected on a per-region basis, at least one of the one or more portions of the obtained two or more frames comprising a super pixel region.

In yet another variant, at least one of the obtained two or more frames of video data comprises a previously generated interpolated frame of video data.

In yet another variant, the non-transitory computer readable medium further comprises instructions which are configured to, when executed by the processing apparatus, cause the computerized apparatus to: compute a criteria between a first frame of the two or more frames of video data and a second frame of the two or more frames of video data; when the criteria is met, determine that the Lagrangian interpolated image and the Eulerian interpolated image should be combined; and when the criteria is not met, determine that either the Lagrangian interpolated image or the Eulerian interpolated image should be chosen.

In yet another variant, the criteria comprises a distance measure between the first frame of the two or more frames of video data and the second frame of the two or more frames of video data.

In yet another variant, the criteria comprises a color similarity measure between the first frame of the two or more frames of video data and the second frame of the two or more frames of video data.

In yet another variant, the criteria comprises an entropy measure between the first frame of the two or more frames of video data and the second frame of the two or more frames of video data.

In a second aspect of the present disclosure, a computer readable storage apparatus is disclosed. In one embodiment, the storage apparatus includes a non-transitory computer readable medium having instructions which are configured to, when executed by a processing apparatus, is configured to: obtain two or more frames of video data; perform Lagrangian interpolation on one or more portions of the obtained two or more frames of video data to generate a Lagrangian interpolated image; perform Eulerian interpolation on one or more portions of the obtained two or more frames to generate a Eulerian interpolated image; and when the Lagrangian interpolated image and the Eulerian interpolated image should be combined, compute an average interpolated image using the Lagrangian interpolated image and the Eulerian interpolated image; otherwise, select either the Lagrangian interpolated image or the Eulerian interpolated image; and generate an interpolated frame of video data using one or more of the average interpolated image, the Lagrangian interpolated image, or the Eulerian interpolated image.

In a third aspect of the present disclosure, an integrated circuit (IC) apparatus is disclosed. In one embodiment, the IC is configured to: obtain two frames of video data from the storage apparatus; compute a criteria between a first frame of the two frames of video data and a second frame of the two frames of video data using the processing apparatus; minimize a cost function associated with the computed criteria; and select one or more interpolation methodologies for the obtained two frames of video data via the interface apparatus using the minimized cost function.

In one variant, the IC is configured to select at least two differing interpolation methodologies for the obtained two frames of video data; weight a first of the at least two differing interpolation methodologies more than a second of the at least two differing interpolation methodologies using the minimized cost function; and combine the at least two differing interpolation methodologies in order to generate an interpolated frame of video data.

In another variant, the generated interpolated frame of video data is interpolated on a per-pixel basis.

In yet another variant, the generated interpolated frame of video data is interpolated on a per-region basis, the per-region basis selected based upon object segmentation of the obtained two or more frames of video data.

In a fourth aspect of the present disclosure, a method of selecting one or more frame interpolation techniques is disclosed. In one embodiment, the method includes obtaining a sequence of frames of video data; obtaining two or more frames of video data from the sequence of frames of video data; selecting one or more interpolation methodologies for the obtained two or more frames of video data; generating an interpolated portion of a frame of video data using the obtained two or more frames of video data; and generating the interpolated frame of video data using at least the generated interpolated portion of the frame of video data.

In one variant, the interpolated frame of video data is generated by interpolating the obtained two or more frames of video data using at least two differing interpolation methodologies.

In another variant, the interpolated frame of video data is generated by combining the at least two differing interpolation methodologies.

In yet another variant, the method further includes computing a criteria between a first frame of the two or more frames of video data and a second frame of the two or more frames of video data; minimizing a cost function associated with the computed criteria; and weighting a first of the at least two differing interpolation methodologies more than a second of the at least two differing interpolation methodologies when combining the at least two differing interpolation methodologies.

In yet another variant, the method further includes obtaining the generated interpolated frame of video data and at least one other frame of video data; and generating a second interpolated frame of video data using the generated interpolated frame of video data and the at least one other frame of video data.

In yet another variant, the generated interpolated frame of video data comprises interpolating using a first interpolation methodology; and the generated interpolated frame of video data comprises interpolating using a first interpolation methodology and the generated second interpolated frame of video data comprises interpolating using a second interpolation methodology, the second interpolation methodology differing from the first interpolation methodology.

In a fifth aspect of the present disclosure, a method for generation of interpolated frames of video data is disclosed. In one embodiment, the method includes: obtaining two or more frames of video data; performing Lagrangian interpolation on one or more portions of the obtained two or more frames of video data to generate a Lagrangian interpolated image; performing Eulerian interpolation on the one or more portions of the obtained two or more frames to generate a Eulerian interpolated image; and when the Lagrangian interpolated image and the Eulerian interpolated image should be combined, computing an average interpolated image using the Lagrangian interpolated image and the Eulerian interpolated image; otherwise, selecting either the Lagrangian interpolated image or the Eulerian interpolated image; and generating an interpolated frame of video data using one or more of the average interpolated image, the Lagrangian interpolated image, or the Eulerian interpolated image.

Other features and advantages of the present disclosure will immediately be recognized by persons of ordinary skill in the art with reference to the attached drawings and detailed description of exemplary implementations as given below.

All Figures disclosed herein are © Copyright 2017 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Methods and apparatus for the intelligent selection of one or more frame interpolation techniques are provided herein. As a brief aside, frame interpolation takes, for example, two frames ($F_1$, $F_2$) as input and outputs one or more interpolated frames ($F_i$) which lie in between the two frames ($F_1$, $F_2$). Moreover, the precise positioning of the interpolated frame ($F_i$) may be dependent upon a value alpha ($\alpha$). Alpha ($\alpha$) represents, inter alia, the amount the video should slow down as, for example, a decimal value between zero and one. For example, if one wants to slow down a video sequence (or portions thereof) by twice the natively captured frame rate, one would select a value of alpha ($\alpha$) of 0.5 (e.g., by transforming a video segment natively captured at 30 frames per second (fps) into a 60 fps sequence of frames). As but another example, if one wants to slow down the video sequence (or portions thereof) by four times the natively captured frame rate, one would select a value of alpha ($\alpha$) of 0.25 (e.g., from 30 fps into a 120 fps sequence of frames).

As discussed elsewhere herein, frame interpolation algorithms generally include a two-step process that include a motion interpolation block and a frame blending block. The motion interpolation block may be based on, for example, the Lagrangian method (e.g., optical flow) which estimates a pixel's (or group of pixels') motion over time, or the Eulerian method (e.g., phase-based motion estimation) which estimates a pixel's (or group of pixels') color change over time. As a result, the motion interpolation block outputs an intermediate frame for a pixel which contains a pixel coordinate (e.g., Cartesian coordinate, Polar coordinate, and/or other types of coordinate systems) that is based on, for example, the original two input images ($F_1$, $F_2$). The frame blending block interpolates the color from ($F_1$, $F_2$) based on the intermediate frame generated by the motion interpolation block. This blending may be a linear blending (e.g., a weighted average $F_i=(1-\alpha)F_1+\alpha F_2$)) or a non-linear function such as gradient domain image blending described in, for example, Xiong, Yingen, and Kari Pullie. "Gradient domain image blending and implementation on mobile devices." International Conference on Mobile Computing, Applications, and Services. Springer Berlin Heidelberg, 2009, or Poisson blending, such as that described in Szeliski, Richard, Matthew Uyttendaele, and Drew Steedly. "Fast Poisson blending using multi-splines." Computational Photography (ICCP), 2011 IEEE International Conference on. IEEE, 2011, each of the foregoing incorporated herein by reference in its entirety.

Exemplary Interpolation Methodologies—

The processes described herein may be performed by a computerized system having at least one processor and a non-transitory computer-readable storage apparatus having a storage medium. The storage medium may store a number of computer-executable instructions thereon, that when executed by the at least one processor, cause the at least one processor to perform the following methodologies described herein. The various methodologies described herein are useful in, for example, the interpolation, storage, transmission and/or reception of this captured video data.

Additionally, the processes described herein (or portions thereof) may be performed by dedicated computerized system logic including, without limitation, application-specific integrated circuits (ASICs), field-programmable gate arrays (FPGAs), and/or other types of integrated circuits or dedicated computerized logic that may be utilized in addition to, or alternatively from, the aforementioned computer-readable storage apparatus.

Figure 1:
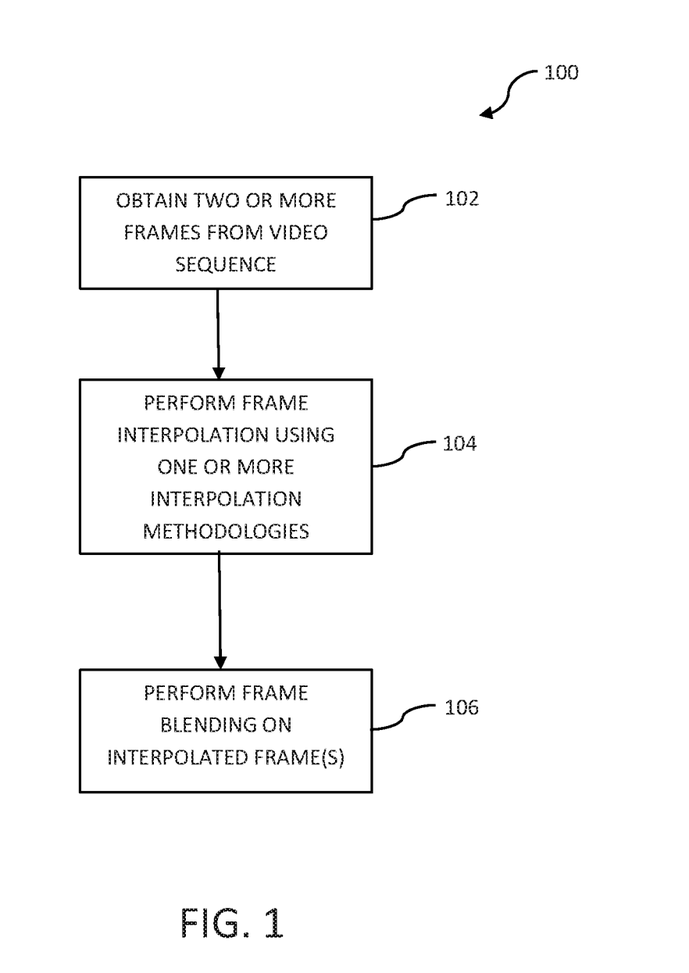
FIG. 1 is a logical flow diagram of a generalized method for generating interpolated frames of video data, in accordance with the principles of the present disclosure.

Referring now to FIG. 1, a generalized methodology for performing frame interpolation 100 is shown and described in detail. At step 102, two or more frames from a video sequence may be obtained. These frames of data may be obtained directly via, for example, an image capture device, or alternatively may be obtained indirectly from, for example, a computer-readable apparatus (e.g., a hard drive and/or other forms of memory). In some implementations, each of these obtained frames will include natively captured content (i.e., frames of video data captured by an image capturing device). In some implementations, one (or more) of the obtained frames may include a previously generated interpolated frame, such as a generated interpolated frame using the processes or apparatuses described herein, while the other one of the obtained frames may include a natively captured frame. In yet other implementations, two (or more) of the obtained frames of video data may include previously generated interpolated frames of video data using, for example, the processes or apparatuses as described herein.

At step 104, motion interpolation is performed on the two or more frames obtained at step 102 using one or more interpolation methodologies. For example, the one or more interpolation methodologies may include Lagrangian interpolation, Eulerian interpolation, variations of Lagrangian and Eulerian interpolation and/or other interpolation algorithms. As a brief aside, the Lagrangian methods are defined as a set of one or more algorithms that estimate a pixel's (or a set of pixels') displacement over time by matching, for example, a neighborhood of pixels in one image frame to a neighborhood of pixels in another image frame in order to generate an interpolated frame. Examples of exemplary Langragian methodologies are described in Weinzaepfel, Philippe, et al. "Deepflow: Large displacement optical flow with deep matching." Proceedings of the IEEE International Conference on Computer Vision. 2013; Brox, Thomas, et al. "High accuracy optical flow estimation based on a theory for warping." European conference on computer vision. Springer Berlin Heidelberg, 2004; and Baker, Simon, et al. "A database and evaluation methodology for optical flow." International Journal of Computer Vision 92.1 (2011): 1-31, the contents of each of the foregoing being incorporated herein by reference in their entireties. Lagrangian methodologies tend to result in inaccurate motion estimations as a result of, for example, large displacements between pixel locations, uniformly colored patch areas (e.g., a large group of pixels with the same/similar color such as the sky, side of a uniformly colored building and other similarly colored objects). in the image, occlusions that may, for example, occlude a given pixel within one frame or the other. As previously discussed, inaccurate motion estimations may lead to low quality or varying levels of distorted interpolated frames. For example, with reference to large pixel displacements between pixel locations (e.g., distances greater than forty (40) pixels or so), some Lagrangian interpolation methodologies may be limited due to, for example, search window size (e.g., searching within a 32 pixel by 32 pixel range due to, inter alia, computational processing constraints).

Additionally, while primarily discussed in the context of performing Lagrangian interpolation linearly (i.e., by performing interpolation between two frames of imaging date), it will be appreciated that higher order Lagrangian interpolation may be performed using imaging data from three or more sets of frames. In some implementations, higher order Lagrangian interpolation may be performed in order to provide for, for example, more accurate motion estimation of one or more pixels in generated interpolated frames. For example, by accurately tracking the motion of pixels through three or more sets of frames, a more accurate interpolation of pixel (object) motion may be determined.

Moreover, Eulerian methods are defined as a set of one or more algorithms that estimate a pixel's (or a set of pixels') change in color or gradient in the frequency domain using, for example, a discrete Fourier transform. For example, a magnitude and phase for one or more pixels located within two or more frames may be obtained and this magnitude and phase information may be utilized for the purposes of performing Eulerian interpolation. Examples of exemplary Eulerian methodologies are described in Davis, Abe, et al. "The visual microphone: passive recovery of sound from video." (2014); Didyk, Piotr, et al. "Joint view expansion and filtering for automultiscopic 3D displays." ACM Transactions on Graphics (TOG) 32.6 (2013): 221; and Wadhwa, Neal, et al. "Phase-based video motion processing." ACM Transactions on Graphics (TOG) 32.4 (2013): 80, the contents of each of the foregoing being incorporated herein by reference in their entireties. Eulerian interpolation methodologies generally work best when there are small phase-shifts between frames, and hence, these methodologies tend to be limited to instances in which relatively small motions between the two image frames are present, in order to accurately generate an interpolated frame. However, in certain instances such as where there are relatively large displacements of objects between frames (e.g., a person appearing on the left-side of the frame in a first frame and then appearing on the right-side of the frame in a subsequent frame), Eulerian interpolation methodologies may result in an interpolated frame that is more visually appealing to a viewer. In other words, Eulerian interpolation may introduce more visually appealing artifacts as compared with, for example, Lagrangian interpolation.

Moreover, the selection of various interpolation methodologies may be independently selected within individual portions of the obtained frames in order to generate an interpolated frame. For example, when capturing a scene, some objects depicted within the captured scene may have relatively small displacements from one frame to the next, while other objects depicted within the captured scene may have comparatively larger displacements between frames. Accordingly, the interpolation methodologies selected may be combined such that the objects having the relatively small displacements may be interpolated using one type of interpolation methodology (e.g., Eulerian), while the objects with the comparatively larger displacements may be interpolated using another type of interpolation methodology (e.g., Lagrangian).

In some implementations, the selection of individual interpolation methodologies may be performed on a per-pixel basis (i.e., individual interpolation methodologies may be selected on a pixel-by-pixel basis). In some implementations, the selection of individual interpolation methodologies may be performed on a per-region basis. These individual regions may include, for example, so-called super pixels such as those described in co-owned and co-pending U.S. patent application Ser. No. 15/251,896 filed Aug. 30, 2016 and entitled "Apparatus and Methods for Video Image Post-Processing for Correcting Artifacts", the contents of which are incorporated herein by reference in its entirety. These individual regions may also include objects generated using other so-called object segmentation techniques. In some implementations, the selection of individual interpolation methodologies may be performed on a pair of frames, or a set of frames. In other words, one interpolated frame, or one set of interpolated frames, may be generated using one interpolation methodology, while another interpolated frame, or another set of interpolated frames, may be generated using another interpolation methodology. In yet other implementations, a hierarchical approach may be utilized for the selection of two or more interpolation methodologies. For example, when an object contained within a scene has a relatively large motion between the two input frames ($F_1$, $F_2$), interpolated frames may be created based on the Lagrangian method at several points (e.g., $F_{1.25}$, $F_{1.50}$, $F_{1.75}$), while the Eulerian method may create interpolated frames between other frames, whether interpolated or natively captured (e.g., ($F_1$, $F_{1.25}$), ($F_{1.25}$, $F_{1.50}$), and ($F_{1.50}$, $F_{1.75}$)).

At step 106, frame blending is performed on the interpolated frame(s) created at step 104. For example, frame blending may take into consideration one or more pixel's color (e.g., RGB values, chrominance/luminance values) using, for example, two input frames ($F_1$, $F_2$). As yet another example, frame blending may take into consideration one or more pixel's color using more than two input frames so as to, inter alia, more accurately estimate interpolated color (i.e., so as to enable higher order interpolated color estimation). As discussed elsewhere herein, this blending may be a linear blending (e.g., a weighted average $F_i=(1-\alpha)F_1+\alpha F_2$, where $\alpha$ represents an intermediate division of time within the obtained pair of frames) or a non-linear function such as, for example, gradient domain image blending. Accordingly, by taking various drawbacks and limitations associated with, for example, Lagrangian and Eulerian interpolation methodologies into consideration, more accurate frame interpolation may be performed.

Figure 2:
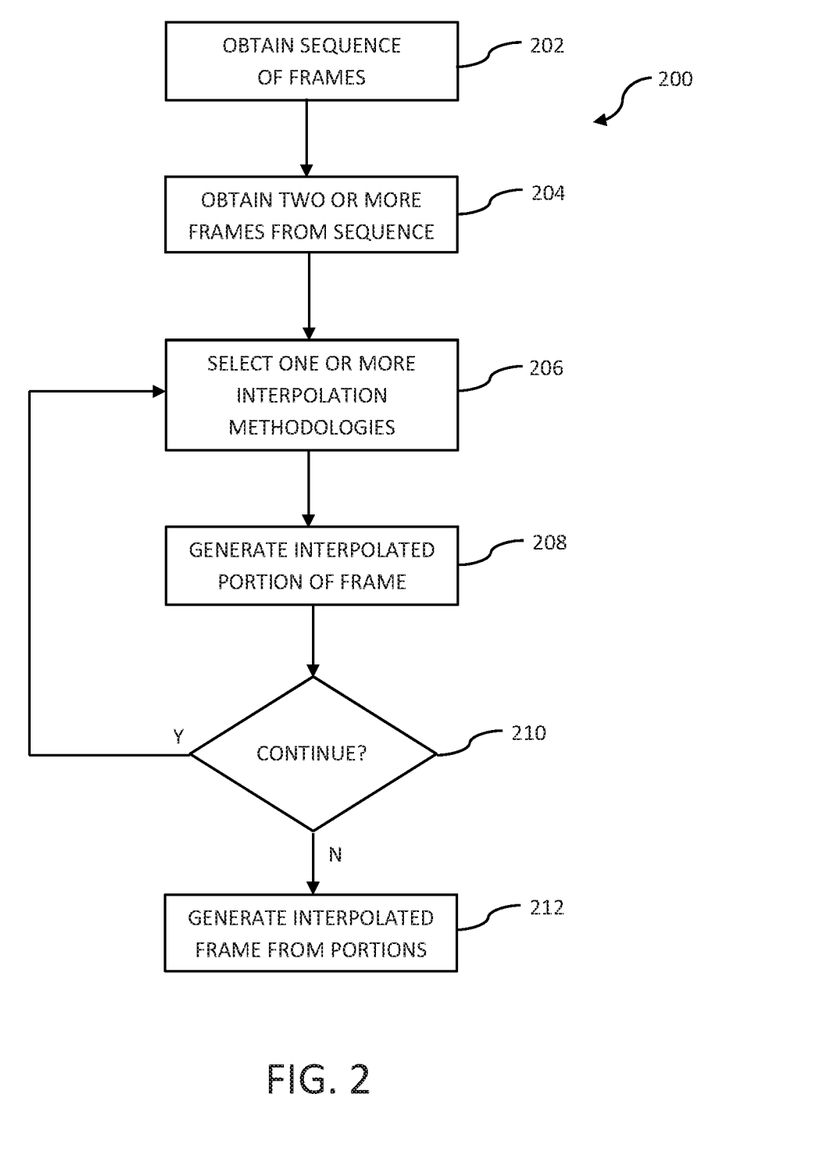
FIG. 2 is a logical flow diagram of an exemplary method for generating an interpolated frame from generated interpolated portions of the frame, in accordance with the principles of the present disclosure.

Referring now to FIG. 2, an exemplary methodology 200 for generating interpolated frame(s) from an obtained sequence of frames is shown. At step 202, a sequence of frames of data is obtained. Obtaining the sequence of frames may be made from retrieving previously captured frames of image data via an extant source (e.g., storage device), or directly (or indirectly) using an image capture device such as, for example, via the HERO family of digital video cameras offered by the assignee hereof. These frames of video data may be obtained at a variety of differing display resolutions (e.g., standard-definition, enhanced-definition, high-definition and ultra-high-definition) and within each of these differing display resolutions, these images may be obtained at a variety of differing frame rates (e.g., twenty-four (24) frames per second, twenty-five (25) frames per second, thirty (30) frames per second, sixty (60) frames per second, one-hundred twenty (120) frames per second, two-hundred forty (240) frames per second and/or other frame rates).

At step 204, two or more frames from the obtained sequence of frames are obtained. In some implementations, these two or more obtained frames will include natively captured frames (i.e., frames of video data captured by an image capturing device) that are obtained directly from the obtained sequence of frames. In some implementations, one of the obtained frames may include a previously generated interpolated frame (step 212), while other one(s) of the obtained frames may include natively captured frame(s) that are obtained directly from the obtained sequence of frames. In yet other implementations, each of the two or more obtained frames may include previously generated interpolated frames of video data that were previously generated at, for example, step 212 discussed subsequently herein.

At step 206, one or more interpolation methodologies are selected for the two or more frames obtained at step 204. In some implementations, one or more Lagrangian interpolation methodologies may be selected (e.g., linear Langrangian interpolation and/or higher order Lagrangian interpolation). Additionally, or alternatively, a Eulerian interpolation methodology may be selected.

At step 208, interpolated portion(s) of a frame are generated. For example, in some implementations, the selection of individual interpolation methodologies may be performed on, for example, a per-pixel basis or on a per-region basis. For example, when considering a per-pixel basis interpolation methodology, the interpolated pixel location will be generated at step 208 and at decision block 210, a decision on whether or not to continue on with generating the interpolated frame is made. If the answer to decision block 210 is yes, the methodology returns to step 206 where one or more interpolation methodologies are selected and an interpolated portion of the frame is generated at step 208. In some implementations, the selection of individual interpolation methodologies may be performed on a per-region basis at steps 206 and 208. For example, one or more interpolation methodologies may be selected for a segmented object and/or a super pixel at step 206 and the interpolated portion(s) for this segmented object and/or super pixel is generated at step 208. At decision block 210, a decision on whether or not to continue on with generating the interpolated frame is made, and if so, the methodology returns to step 206 where one or more interpolation methodologies is selected and an interpolated portion of the frame is generated at step 208.

At step 212, upon the determination to no longer continue with the generation of interpolated portion(s) of frame at decision block 210, the interpolated frame is generated from the interpolated portions of frames generated at step 208. In some implementations, the selection of individual interpolation methodologies at step 206 may be performed unilaterally on a pair of frames, or a set of frames. For example, one interpolated frame, or one set of interpolated frames, may be generated using one interpolation methodology, while another interpolated frame, or another set of interpolated frames, may be generated using another interpolation methodology. In yet other implementations, a hierarchical approach may be utilized for the selection of two or more interpolation methodologies as discussed previously herein. These and other variations would be readily apparent to one of ordinary skill given the contents of the present disclosure.

Figure 3:
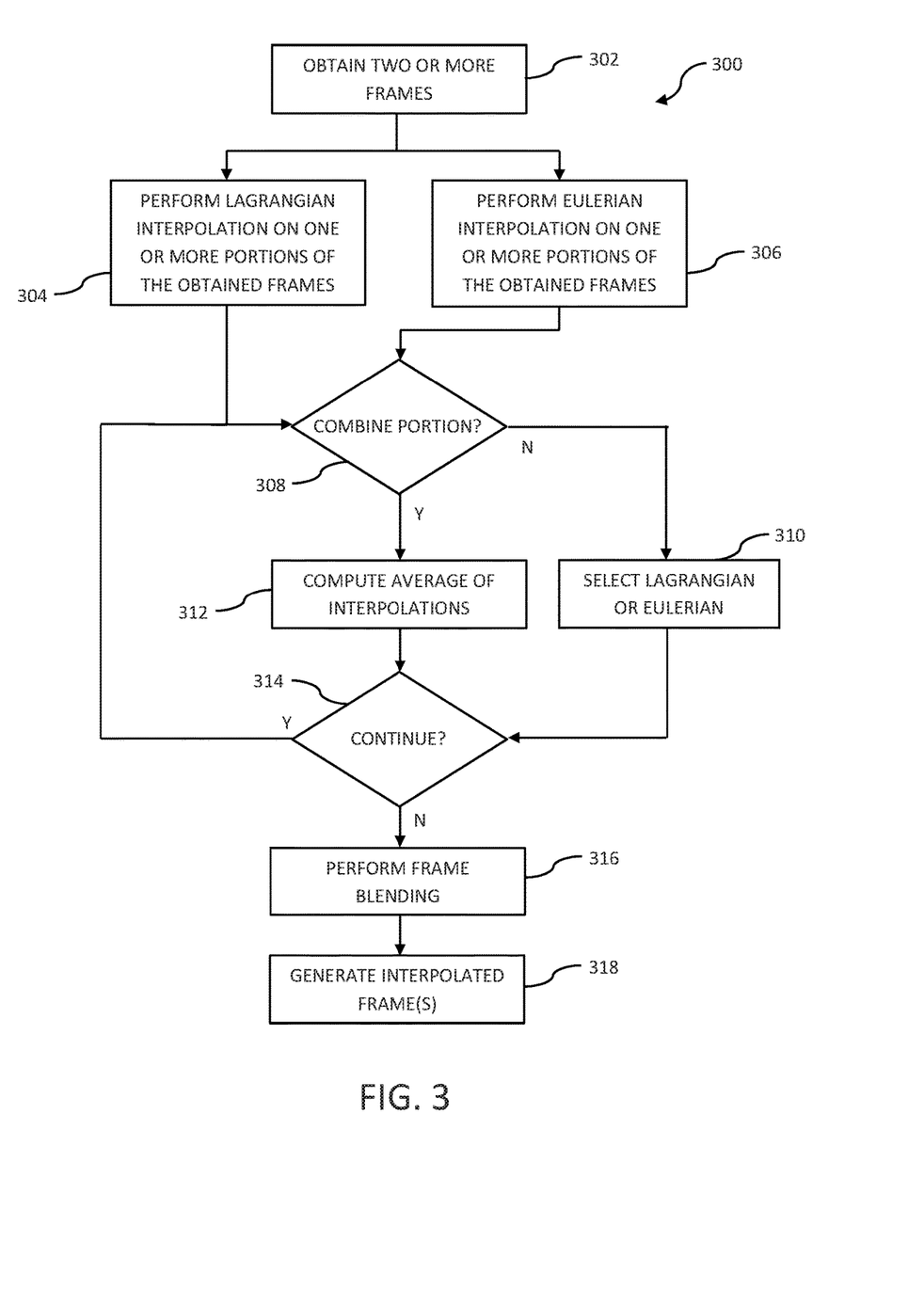
FIG. 3 is a logical flow diagram of an exemplary method for generating interpolated frame(s) of video data, in accordance with the principles of the present disclosure.

Referring now to FIG. 3, one exemplary methodology 300 for generating interpolated frame(s) of data are shown and described in detail. At step 302, two or more frames of data are obtained. As discussed elsewhere herein, these obtained frames of data may be made from retrieving previously captured frames of image data via an extant source (e.g., storage device), or directly (or indirectly) using an image capture device. These frames of video data may be obtained at a variety of differing display resolutions and at a variety of differing frame rates. In some implementations, these two or more obtained frames will include natively captured frames (i.e., frames of video data captured by an image capturing device) that are obtained directly from the obtained sequence of frames. In some implementations, one of the obtained frames may include a previously generated interpolated frame such as, for example, an interpolated frame generated at step 318, while other one(s) of the obtained frames may include natively captured frame(s). In yet other implementations, each of the two or more obtained frames may include previously generated interpolated frames of video data that were previously generated at, for example, step 318 discussed subsequently herein.

At step 304, Lagrangian interpolation is performed on one or more portions of the frames obtained at step 302. In addition, at step 306 Eulerian interpolation is performed on one or more portions of the frames obtained at step 302. In other words, both interpolation methodologies are separately performed on the frames of data obtained at step 302. In some implementations, these Lagrangian and Eulerian interpolations may be performed simultaneously. Alternatively, these Langrangian and Eulerian interpolations may be performed sequentially (i.e., first Lagrangian followed by Eulerian and vice versa). These and other variations would be readily apparent to one of ordinary skill given the contents of the present disclosure.

At decision block 308, a determination is made regarding whether or not the interpolated portions should be combined. There are several criteria that may be utilized in order to make such a determination. One such criteria relies on the determination of whether a spatial constraint is upheld. For example, a distance measure between the initial location(s) of a pixel (or group of pixels) in an initial frame and corresponding pixel (or group of pixels) location(s) in subsequent frames may be utilized in order to make this determination. In some implementations, this distance measure may include a Euclidean Distance measurement, a Manhattan Distance measurement, a Great-Circle Distance measurement (in terms of handling three-dimensional (3D) content) and/or other forms of distance measurements.

Other such criteria may be utilized in addition to, or alternatively from, the distance measure discussed supra. For example, a color similarity measure may be determined between the initial pixel (or group of pixels) in an initial frame and corresponding pixel (or group of pixels) in subsequent frames may be utilized in order to make this determination. In some implementations, this color similarity measure may include a Euclidean Distance measurement, a Just-Noticeable Difference (JND) measurement, and/or other color similarity measures.

Additionally, other such criteria may be utilized in addition to, or alternatively from, the aforementioned distance measure(s) and/or color similarity measure(s). For example, an entropy measure may be determined between the initial pixel (or group of pixels) in an initial frame and corresponding pixel (or group of pixels) in subsequent frames may be utilized in order to make this determination. In some implementations, this entropy measure may include a Shannon Entropy measure such as that disclosed in C. E. Shannon. A mathematical theory of communication. Bell Syst. Tech. J., 27:379-423, 623-656, 1948, the contents of the foregoing being incorporated herein by reference in its entirety. In some implementations, various ones of the aforementioned distance, color similarity, and/or entropy measure may be utilized in order to minimize a cost function that is formed by, for example, spatial relationships between pixels (or groups of pixels) and/or histograms or gradients of colors between pixels (or groups of pixels) in the immediate and subsequent frame(s).

If the answer to decision block 308 is no (e.g., a measure is above or below a given threshold value), a selection of either a Lagrangian or Eulerian interpolation methodology is chosen for one or more portions of the obtained frames. As discussed elsewhere herein, the selection of individual interpolation methodologies may be performed on a per-pixel basis, a per-region basis (e.g., as a result of object segmentation and/or super pixels), a per-frame basis, or based on the aforementioned hierarchical approach described elsewhere herein. If the answer to decision block 308 is yes, the interpolated portion(s) are combined by utilizing, for example, a computed average of the individual interpolations performed at steps 304 and 306, at step 312. In some implementations, the computed average may include a weighted average of both the performed Lagrangian and Eulerian interpolations. For example, based on the minimized cost function, it may be determined that the Lagrangian interpolation methodology should be weighted more than the Eulerian interpolation methodology when these portion(s) are combined. In some implementations, it may be determined that the Eulerian interpolation methodology should be weighted more than the Langrangian interpolation methodology when these portion(s) are combined. In yet other implementations, it may be determined that the Eulerian interpolation methodology should be weighted equally with the Langrangian interpolation methodology when these portion(s) are combined. These and other variants would be readily apparent to one of ordinary skill given the contents of the present disclosure.

At decision block 314, a determination is made as to whether to continue with the interpolation of the two or more frames obtained at step 302. If interpolation should continue, the process advances to decision block 308 where other portions of the obtained frame are interpolated. For example, in some implementations, a prior portion of the interpolated frame may have selected for Lagrangian interpolation at step 310, while a subsequent portion of the interpolated frame may be interpolated using a computed average of the interpolations. As yet another example, in some implementations, a prior portion of the interpolated frame may have selected for Eulerian interpolation at step 310, while a subsequent portion of the interpolated frame may be interpolated using a computed average of the interpolations. As yet another example, in some implementations, a prior portion of the interpolated frame may have selected a computed average of the Lagrangian and Eulerian interpolations at step 312, while a subsequent portion of the interpolated frame may select a Lagrangian interpolation at step 310. As yet another example, in some implementations, a prior portion of the interpolated frame may have selected a computed average of the Lagrangian and Eulerian interpolations at step 312, while a subsequent portion of the interpolated frame may again select a computed average of the Lagrangian and Eulerian interpolations at step 312. These and other variations would be readily apparent to one of ordinary skill given the contents of the present disclosure.

At step 316, frame blending is performed on the interpolated portion(s) generated at either step 312 or step 310. As discussed elsewhere herein, frame blending interpolates the color from $(F_1, F_2)$ based on the intermediate frame generated by the motion interpolation block. As previously discussed, this blending may be a linear blending (e.g., a weighted average $F_i=(1-\alpha)F_1+\alpha F_2$)) or a non-linear function such as, for example, gradient domain image blending described in, for example, Xiong, Yingen, and Kari Pullie. "Gradient domain image blending and implementation on mobile devices." International Conference on Mobile Computing, Applications, and Services. Springer Berlin Heidelberg, 2009, or Poisson blending, such as that described in Szeliski, Richard, Matthew Uyttendaele, and Drew Steedly. "Fast Poisson blending using multi-splines." Computational Photography (ICCP), 2011 IEEE International Conference on. IEEE, 2011, each of the foregoing previously incorporated herein by reference in its entirety. At step 318, the interpolated frame(s) are generated from, for example, the frame blending block at step 316.

Figure 4:
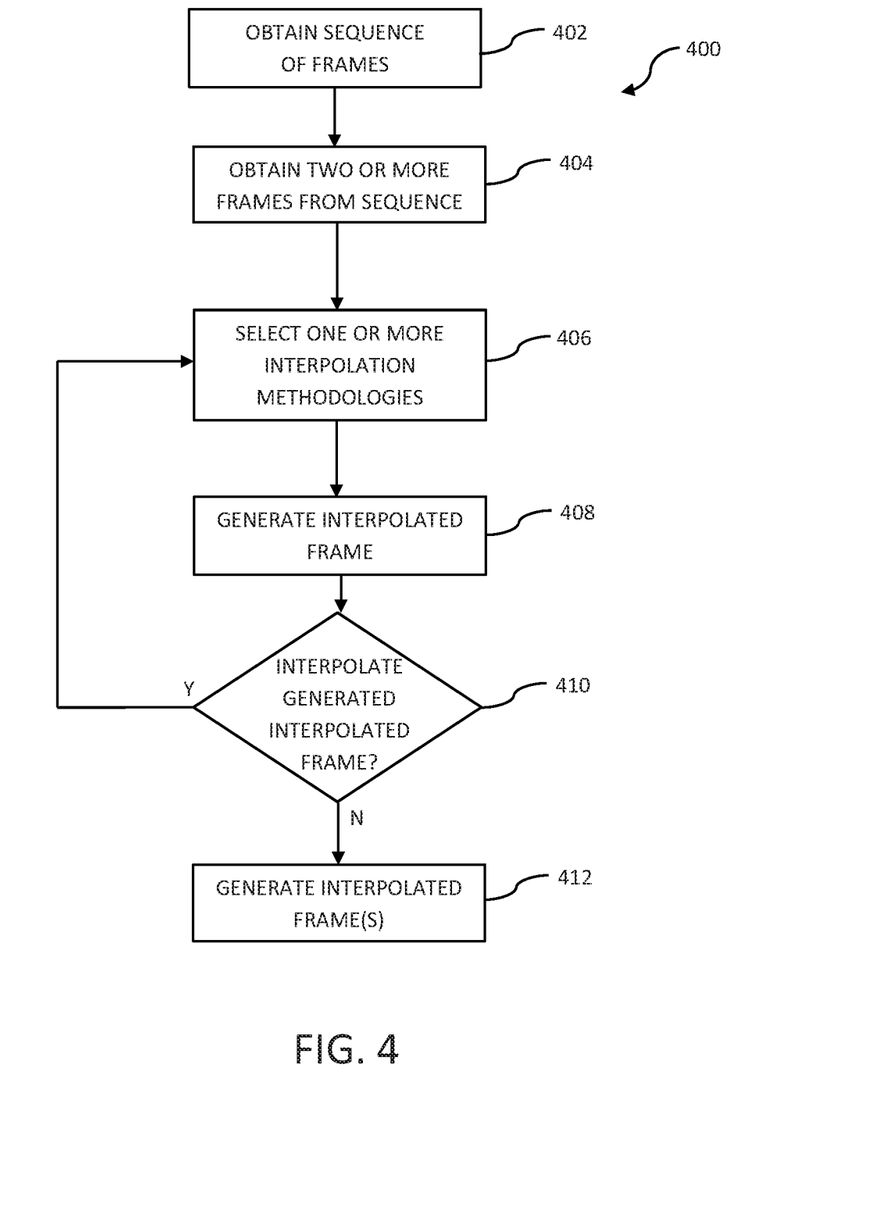
FIG. 4 is a logical flow diagram of an exemplary method for generating interpolated frame(s) of video data using a hierarchical interpolation methodology, in accordance with the principles of the present disclosure.

Referring now to FIG. 4, an exemplary methodology 400 for generating interpolated frames in accordance with the aforementioned hierarchical approach is shown and described in detail. At step 402, a sequence of frames of data is obtained. Obtaining the sequence of frames may be made from retrieving previously captured frames of image data via an extant source, or directly (or indirectly) using an image capture device. These frames of video data may be obtained at a variety of differing display resolutions and within each of these differing display resolutions, these images may be obtained at a variety of differing frame rates. At step 404, two or more frames from the obtained sequence of frames are obtained and at step 406, one or more interpolation methodologies are selected for the two or more frames obtained at step 404. In some implementations, one or more Lagrangian interpolation methodologies may be selected (e.g., linear Langrangian interpolation and/or higher order Lagrangian interpolation). In other implementations, a Eulerian interpolation methodology may be selected. In yet other implementations, a Langrangian interpolation may be combined with a Eulerian interpolation methodology by computing an average of the interpolations using, for example, the methodology previously described at step 312 in FIG. 3.

At step 408, an interpolated frame (or portions thereof) are generated based on the selected interpolation methodology chosen at step 406. At step 410, a decision is made as to whether or not to generate an additional interpolated frame (or portions thereof) from the generated interpolated frame (or portions thereof) at step 408. If the answer to decision block 410 is no, the process methodology advances to step 412 where the interpolated frame (or portions thereof) are generated. If the answer to decision block 410 is yes, the process methodology advances to block 406 where one or more interpolation methodologies are selected and the process continues.

For example, and as discussed elsewhere herein, using the aforementioned hierarchical approach, when an object contained within a scene has a relatively large motion between the two input frames $(F_1, F_2)$, interpolated frames may be created based on the Lagrangian method at one or more points in time (e.g., $F_{1.25}, F_{1.50}, F_{1.75}$), while the Eulerian method may create interpolated frames between other ones of the frames, whether interpolated or natively captured (e.g., between $(F_1, F_{1.25})$, $(F_{1.25}, F_{1.50})$, and $(F_{1.50}, F_{1.75})$, as but one example).

Exemplary Apparatus—

Figure 5:
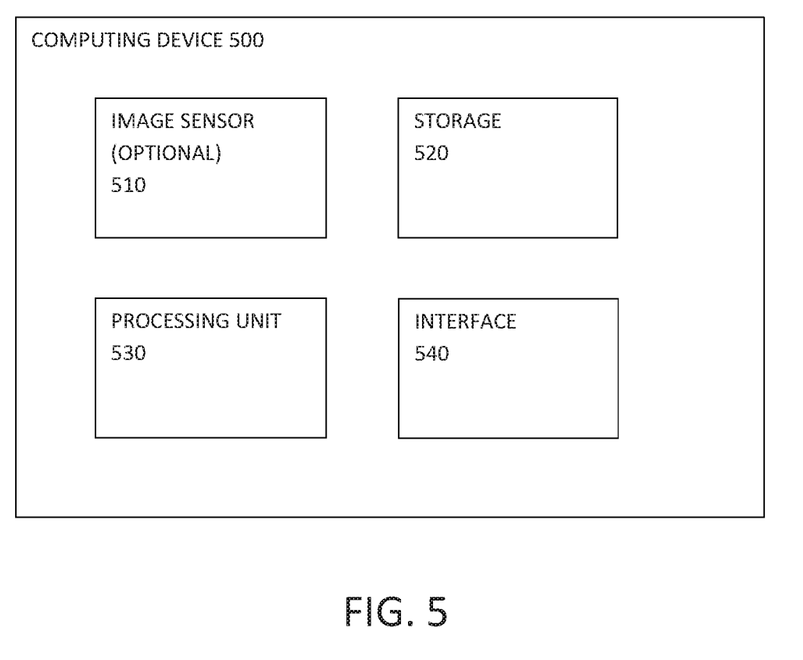
FIG. 5 is a block diagram of an exemplary implementation of a computing device, useful in performing the methodologies described herein.

FIG. 5 is a block diagram illustrating an embodiment of a computing device, in accordance with the principles described herein. The computing device 500 of the embodiment of FIG. 5 includes an optional image sensor 510, a storage module 520, a processing unit 530, and an interface module 540. The various components of the computing device 500 are communicatively coupled, for instance via a communications bus not illustrated herein, thereby enabling communication between the various ones of the components.

The image sensor 510 is configured to convert light incident upon the image sensor chip into electrical signals representative of the light incident upon the image sensor. Such a process is referred to as "capturing" image or video data, and capturing image data representative of an image is referred to as "capturing an image" or "capturing a frame". The image sensor can be configured to capture images at one or more frame rates, and can be configured to capture an image in a first interval of time and then wait a second interval of time before capturing another image (during which no image data is captured). The image sensor can include a charge-coupled device ("CCD") image sensor, a complementary metal-oxide semiconductor ("CMOS") image sensor, or any other suitable image sensor configured to convert captured light incident upon the image sensor chip into image data. Moreover, while the image sensor 510 is illustrated as forming part of the computing device 500, it is appreciated that in one or more other implementations, image sensor 510 may be located remote from computing device 510 (such as via a camera) and instead, images captured via the image sensor may be communicated to the computing device via the interface module 540.

The methodologies described herein, as well as the operation of the various components of the computing device can be controlled by the processing unit 530. In one embodiment, the processing unit is embodied within one or more integrated circuits and includes a processor and a memory comprising a non-transitory computer-readable storage apparatus storing computer-executable program instructions for performing the image post-processing methodologies described herein, among other functions. In such an embodiment, the processor can execute the computer-executable program instructions to perform these functions. It should be noted that the processing unit can implement the image post-processing methodologies described herein in hardware, firmware, or a combination of hardware, firmware, and/or software. In some embodiments, the storage module 520 stores the computer-executable program instructions for performing the functions described herein for execution by the processing unit 530.

The storage module 520 includes a non-transitory computer-readable storage apparatus configured to store data. The storage module can include any suitable type of storage, such as random-access memory, solid state memory, a hard disk drive, buffer memory, and the like. The storage module can store image data captured by the image sensor 510. In addition, the storage module may store a computer program or software useful in performing the post-processing methodologies described herein with reference to FIGS. 1 through 4 utilizing the image or video data captured by image sensor 510.

The interface module 540 allows a user of the computing device to perform the various processing steps associated with the methodologies described herein. For example, the interface module 540 may allow a user of the computing device to begin or end capturing images or video, may allow a user to perform the various interpolation methodologies described herein. Additionally, the interface module 540 may allow a user to generate interpolated frame(s) of data as well as receive image or video data from a remote image sensor, or a remote storage device. Moreover, the interface module 540 optionally includes a display in order to, inter alia, display the interpolated frame(s) of data and the captured frame(s) of data. Additionally, the interface module 540 may include one or more network interface(s) to enable communication with, for example, other computing devices, whether similar or different.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (802.15), or IrDA families.

As used herein, the terms "processing unit" and "processor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus for generation of interpolated frames of video data, the computerized apparatus comprising:
a processing apparatus; and
a storage apparatus in data communication with the processing apparatus, the storage apparatus having a non-transitory computer readable medium comprising instructions which are configured to, when executed by the processing apparatus, cause the computerized apparatus to:
obtain two or more frames of video data;
perform Lagrangian interpolation on one or more portions of the obtained two or more frames of video data to generate a Lagrangian interpolated image;
perform Eulerian interpolation on the one or more portions of the obtained two or more frames to generate a Eulerian interpolated image; and
when the Lagrangian interpolated image and the Eulerian interpolated image should be combined, compute an average interpolated image using the Lagrangian interpolated image and the Eulerian interpolated image;
otherwise, select either the Lagrangian interpolated image or the Eulerian interpolated image; and
generate an interpolated frame of video data using one or more of the average interpolated image, the Lagrangian interpolated image, or the Eulerian interpolated image.

2. The computerized apparatus of claim 1, wherein the non-transitory computer readable medium further comprises instructions which are configured to, when executed by the processing apparatus, cause the computerized apparatus to:
generate the interpolated frame of video data using two or more of the average interpolated image, the Lagrangian interpolated image, or the Eulerian interpolated image.

3. The computerized apparatus of claim 2, wherein the non-transitory computer readable medium further comprises instructions which are configured to, when executed by the processing apparatus, cause the computerized apparatus to:
generate the interpolated frame of video data using the average interpolated image, the Lagrangian interpolated image, and the Eulerian interpolated image.

4. The computerized apparatus of claim 1, wherein the one or more portions of the obtained two or more frames are selected on a per-pixel basis.

5. The computerized apparatus of claim 1, wherein the one or more portions of the obtained two or more frames are selected on a per-region basis, at least one of the one or more portions of the obtained two or more frames comprising a super pixel region.

6. The computerized apparatus of claim 1, wherein at least one of the obtained two or more frames of video data comprises a previously generated interpolated frame of video data.

7. The computerized apparatus of claim 1, wherein the non-transitory computer readable medium further comprises instructions which are configured to, when executed by the processing apparatus, cause the computerized apparatus to:
compute a criteria between a first frame of the two or more frames of video data and a second frame of the two or more frames of video data;
when the criteria is met, determine that the Lagrangian interpolated image and the Eulerian interpolated image should be combined; and
when the criteria is not met, determine that either the Lagrangian interpolated image or the Eulerian interpolated image should be chosen.

8. The computerized apparatus of claim 7, wherein the criteria comprises a distance measure between the first frame of the two or more frames of video data and the second frame of the two or more frames of video data.

9. The computerized apparatus of claim 7, wherein the criteria comprises a color similarity measure between the first frame of the two or more frames of video data and the second frame of the two or more frames of video data.

10. The computerized apparatus of claim 7, wherein the criteria comprises an entropy measure between the first frame of the two or more frames of video data and the second frame of the two or more frames of video data.

11. A method for generation of interpolated frames of video data, the method comprising:
obtaining two or more frames of video data;
performing Lagrangian interpolation on one or more portions of the obtained two or more frames of video data to generate a Lagrangian interpolated image;
performing Eulerian interpolation on the one or more portions of the obtained two or more frames to generate a Eulerian interpolated image; and
when the Lagrangian interpolated image and the Eulerian interpolated image should be combined, computing an average interpolated image using the Lagrangian interpolated image and the Eulerian interpolated image;
otherwise, selecting either the Lagrangian interpolated image or the Eulerian interpolated image; and
generating an interpolated frame of video data using one or more of the average interpolated image, the Lagrangian interpolated image, or the Eulerian interpolated image.

12. The method of claim 11, further comprising:
computing a criterion between a first frame of the two or more frames of video data and a second frame of the two or more frames of video data;
minimizing a cost function associated with the computed criterion;
weighting a first one of the one or more interpolation methodologies more than a second one of the one or more interpolation methodologies; and
combining the at least two differing interpolation methodologies.

13. The method of claim 11, wherein the obtaining of the two or more frames comprises selecting the two or more frames on (i) a per-pixel basis or (ii) a per-region basis.

14. The method of claim 11, wherein the obtaining of the two or more frames comprises obtaining a previously generated interpolated frame of video data.

15. The method of claim 11, further comprising:
computing a criteria between a first frame of the two or more frames of video data and a second frame of the two or more frames of video data;
when the criteria is met, determining that the Lagrangian interpolated image and the Eulerian interpolated image should be combined; and
when the criteria is not met, determining that either the Lagrangian interpolated image or the Eulerian interpolated image should be chosen.

16. A non-transitory computer-readable apparatus comprising a storage medium, the storage medium having a computer program thereon, the computer program comprising a plurality of instructions configured to, when executed by a processor apparatus, cause the processor apparatus to:
obtain two or more frames of video data;
perform Lagrangian interpolation on one or more portions of the obtained two or more frames of video data to generate a Lagrangian interpolated image;
perform Eulerian interpolation on the one or more portions of the obtained two or more frames to generate a Eulerian interpolated image; and
responsive to a determination that the Lagrangian interpolated image and the Eulerian interpolated image should be combined, compute an average interpolated image using the Lagrangian interpolated image and the Eulerian interpolated image;
responsive to a determination that the Lagrangian interpolated image and the Eulerian interpolated image should not be combined, select either the Lagrangian interpolated image or the Eulerian interpolated image; and
generate an interpolated frame of video data using one or more of the average interpolated image, the Lagrangian interpolated image, or the Eulerian interpolated image.

17. The non-transitory computer-readable apparatus of claim 16, wherein the determination that the Lagrangian interpolated image and the Eulerian interpolated image should be combined is based on one or more of (i) a distance measure between an initial pixel of a first one of the two or more frames of video data and a corresponding pixel of one or more subsequent ones of the two or more frames of video data, (ii) a color similarity measure between the initial pixel and the corresponding pixel, and (iii) an entropy measure between the initial pixel and the corresponding pixel.

18. The non-transitory computer-readable apparatus of claim 16, wherein the plurality of instructions are further configured to, when executed by the processor apparatus, cause the processor apparatus to:
determine whether to generate an additional interpolated frame of video data based on the generated interpolated frame of video data;
when it is determined to generate the additional interpolated frame of video data, select additional one or more interpolation methodologies; and
generate the additional interpolated frame of video data by performing the selected additional one or more interpolation methodologies.

19. The non-transitory computer-readable apparatus of claim 16, wherein the generation of the interpolated frame of video data comprises using two or more of the average interpolated image, the Lagrangian interpolated image, or the Eulerian interpolated image.

20. The non-transitory computer-readable apparatus of claim 16, wherein the plurality of instructions are further configured to, when executed by the processor apparatus, cause the processor apparatus to:
obtain the generated interpolated frame of video data and at least one other frame of video data; and
generate a second interpolated frame of video data using the generated interpolated frame of video data and the at least one other frame of video data.

* * * * *